(12) United States Patent
 K et al.

(10) Patent No.: US 12,038,836 B2
(45) Date of Patent: Jul. 16, 2024

(54) DYNAMIC MEMORY ALLOCATION BASED ON WORKLOAD CHARACTERIZATION AND OPTIMIZATION

(71) Applicant: Dell Products L.P., Round Rock, TX (US)

(72) Inventors: Krishnaprasad K, Bengaluru (IN); Vinod P S, Bangalore (IN); Gobind Vijayakumar, Trichy (IN)

(73) Assignee: Dell Products L.P., Round Rock, TX (US)

( * ) Notice: Subject to any disclaimer, the term of this patent is extended or adjusted under 35 U.S.C. 154(b) by 822 days.

(21) Appl. No.: 17/069,568

(22) Filed: Oct. 13, 2020

(65) Prior Publication Data

US 2022/0114025 A1 Apr. 14, 2022

(51) Int. Cl.
*G06F 12/06* (2006.01)
*G06F 9/4401* (2018.01)
(Continued)

(52) U.S. Cl.
CPC ........ *G06F 12/0646* (2013.01); *G06F 9/5016* (2013.01); *G06F 12/0246* (2013.01); *G06F 9/4401* (2013.01); *G06F 2212/205* (2013.01); *G06F 2212/7201* (2013.01); *G06F 2212/7202* (2013.01)

(58) Field of Classification Search
None
See application file for complete search history.

(56) References Cited

U.S. PATENT DOCUMENTS 11,586,536 B1 * 2/2023 Jha ...................... G06F 21/6218
2016/0179375 A1 * 6/2016 Kirvan ................ G06F 12/0246
711/153
(Continued)

FOREIGN PATENT DOCUMENTS

WO   WO-2021238594 A1 * 12/2021 ............. G06F 12/10

OTHER PUBLICATIONS

Hewlett Packard Enterprise. "Using NVDIMM Persistent Memory Server Technology with Linux." Nov. 2017. https://h50146.www5. hpe.com/products/software/oe/linux/mainstream/support/whitepaper/ pdfs/a00036172enw.pdf.*
(Continued)

*Primary Examiner* — Nathan Sadler
(74) *Attorney, Agent, or Firm* — Jackson Walker L.L.P.

(57) ABSTRACT

An information handling system may include a persistent memory module and a basic input/output system (BIOS). The information handling system may be configured to: prior to initialization of an operating system, receive, at a configuration application of the BIOS, configuration information regarding the persistent memory module; in response to the configuration information, allocate a first portion of the persistent memory module to volatile system memory of the information handling system, a second portion of the persistent memory module to non-volatile storage of the information handling system, and a third portion of the persistent memory module to a dynamic memory area; and after initialization of the operating system, execute a memory manager configured to alter sizes of the first portion, the second portion, and the third portion, wherein the altering is carried out without performing a reboot of the information handling system.

20 Claims, 2 Drawing Sheets

(51) Int. Cl.
*G06F 9/50* (2006.01)
*G06F 12/02* (2006.01)

(56) References Cited

U.S. PATENT DOCUMENTS

| | | | | |
|---|---|---|---|---|
| 2016/0321083 | A1* | 11/2016 | Costa | G06F 12/0284 |
| 2017/0300442 | A1* | 10/2017 | Xue | G06F 13/36 |
| 2019/0042458 | A1* | 2/2019 | Kumar | G06F 12/0895 |
| 2019/0095114 | A1* | 3/2019 | Prasad | G06F 11/07 |
| 2019/0332262 | A1* | 10/2019 | Prasad | G06F 3/0679 |

OTHER PUBLICATIONS

UEFI Forum. Advanced Configuration and Power Interface (ACPI) Specification. Jan. 2019. Version 6.3.*
Stellarhopper. "daxctl: add a new reconfigure-device command." Aug. 2019. https://github.com/pmem/ndctl/commit/8c2d55b631e776d0b20b28b2a04ba199eca794d0.*

* cited by examiner

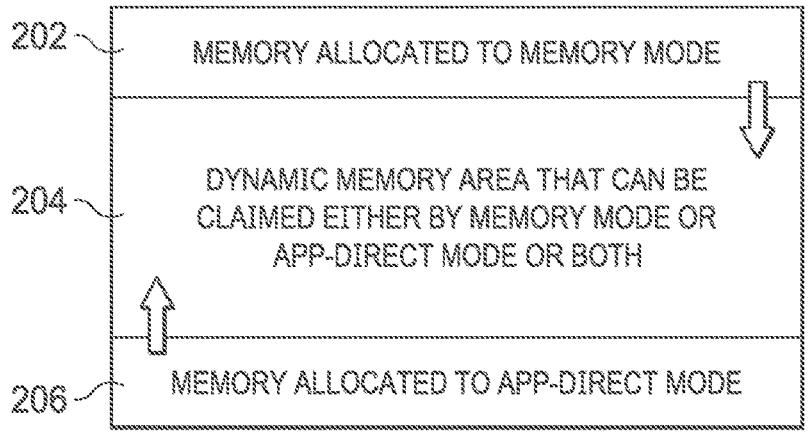
FIG. 2
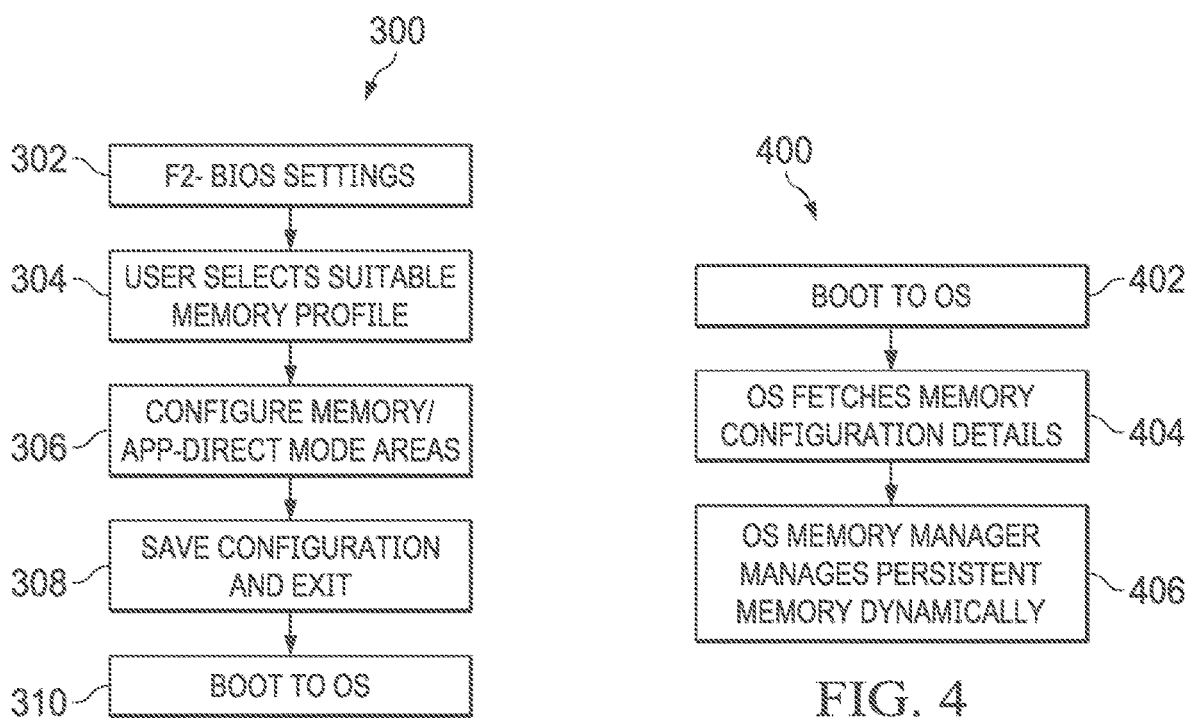
FIG. 3
FIG. 4

DYNAMIC MEMORY ALLOCATION BASED ON WORKLOAD CHARACTERIZATION AND OPTIMIZATION

TECHNICAL FIELD

The present disclosure relates in general to information handling systems, and more particularly to memory allocation in persistent memory systems.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Various types of persistent memory are becoming more popular, particularly for use in datacenter environments. For example, various types of non-volatile dual in-line memory modules (NVDIMMs) are in common use. As another example, the Intel® Data Center Persistent Memory Module (DCPMM) is an emerging technology where non-volatile media is placed onto a DIMM form factor (e.g., a standard DDR4 DIMM form factor) and installed on the memory bus.

Persistent memory DIMMs may exist alongside traditional volatile memory DRAM DIMMs. The main difference between persistent memory DIMMs and DRAM DIMMs is that the data stored on persistent memory DIMMs can be retained when the system is shut down or loses power. This allows persistent memory to be used as a form of permanent storage like hard disk drives (HDDs), solid-state drives (SSDs), etc., but with memory-like latencies.

Some types of persistent memory modules can be configured for use in different modes. For example, a Memory Mode, an App Direct Mode, or a combination of Memory Mode and App Direct Mode (referred to as "Mixed Mode") may be available on some devices.

In Memory Mode, the persistent memory may act as volatile system memory under the control of the operating system (OS). Any DRAM in the platform may act as a cache, working in conjunction with the persistent memory. In App Direct Mode, the persistent memory and DRAM DIMMs may act as independent memory resources under direct load/store control of an application. This may allow the persistent memory capacity to be used as byte-addressable persistent memory that is mapped into the system physical address space (SPA) and is directly accessible by applications. In Mixed Mode, some portion of the persistent memory capacity is used in Memory Mode, and the remainder in App Direct Mode.

With the increased adoption of persistent memory in the datacenter, it is predicted that the usage of Mixed Mode will continue to increase in the coming years. Today, memory allocation of persistent memory in Mixed Mode must be predefined in terms of the percentages of total memory allocated to Memory Mode and App Direct Mode. Mixed Mode currently does not offer an option to manage the size of memory allocated dynamically from the operating system, which forces the user to reboot the system to change the persistent memory allocation through BIOS settings.

Embodiments of this disclosure may provide more flexibility in the allocation of persistent memory.

It should be noted that the discussion of a technique in the Background section of this disclosure does not constitute an admission of prior-art status. No such admissions are made herein, unless clearly and unambiguously identified as such.

SUMMARY

In accordance with the teachings of the present disclosure, the disadvantages and problems associated with memory allocation in persistent memory systems may be reduced or eliminated.

In accordance with embodiments of the present disclosure, an information handling system may include a persistent memory module and a basic input/output system (BIOS). The information handling system may be configured to: prior to initialization of an operating system, receive, at a configuration application of the BIOS, configuration information regarding the persistent memory module; in response to the configuration information, allocate a first portion of the persistent memory module to volatile system memory of the information handling system, a second portion of the persistent memory module to non-volatile storage of the information handling system, and a third portion of the persistent memory module to a dynamic memory area; and after initialization of the operating system, execute a memory manager configured to alter sizes of the first portion, the second portion, and the third portion, wherein the altering is carried out without performing a reboot of the information handling system.

In accordance with these and other embodiments of the present disclosure, a method may include a basic input/output system (BIOS) of an information handling system receiving, prior to initialization of an operating system, configuration information regarding a persistent memory module of the information handling system; in response to the configuration information, the BIOS allocating a first portion of the persistent memory module to volatile system memory of the information handling system, a second portion of the persistent memory module to non-volatile storage of the information handling system, and a third portion of the persistent memory module to a dynamic memory area; and after initialization of the operating system, the information handling system executing a memory manager configured to alter sizes of the first portion, the second portion, and the third portion, wherein the altering is carried out without performing a reboot of the information handling system.

In accordance with these and other embodiments of the present disclosure, an article of manufacture may include a non-transitory, computer-readable medium having computer-executable code thereon that is executable by an information handling system for: a basic input/output system (BIOS) of the information handling system receiving, prior to initialization of an operating system, configuration information regarding a persistent memory module of the information handling system; in response to the configuration information, the BIOS allocating a first portion of the persistent memory module to volatile system memory of the information handling system, a second portion of the persistent memory module to non-volatile storage of the information handling system, and a third portion of the persistent memory module to a dynamic memory area; and after initialization of the operating system, executing a memory manager configured to alter sizes of the first portion, the second portion, and the third portion, wherein the altering is carried out without performing a reboot of the information handling system.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein:

FIG. 2 illustrates a block diagram of a persistent memory, in accordance with embodiments of this disclosure;

FIG. 3 illustrates an example process flow, in accordance with embodiments of the present disclosure; and FIG. 4 illustrates an example process flow, in accordance with embodiments of the present disclosure.

DETAILED DESCRIPTION

Figure 1:
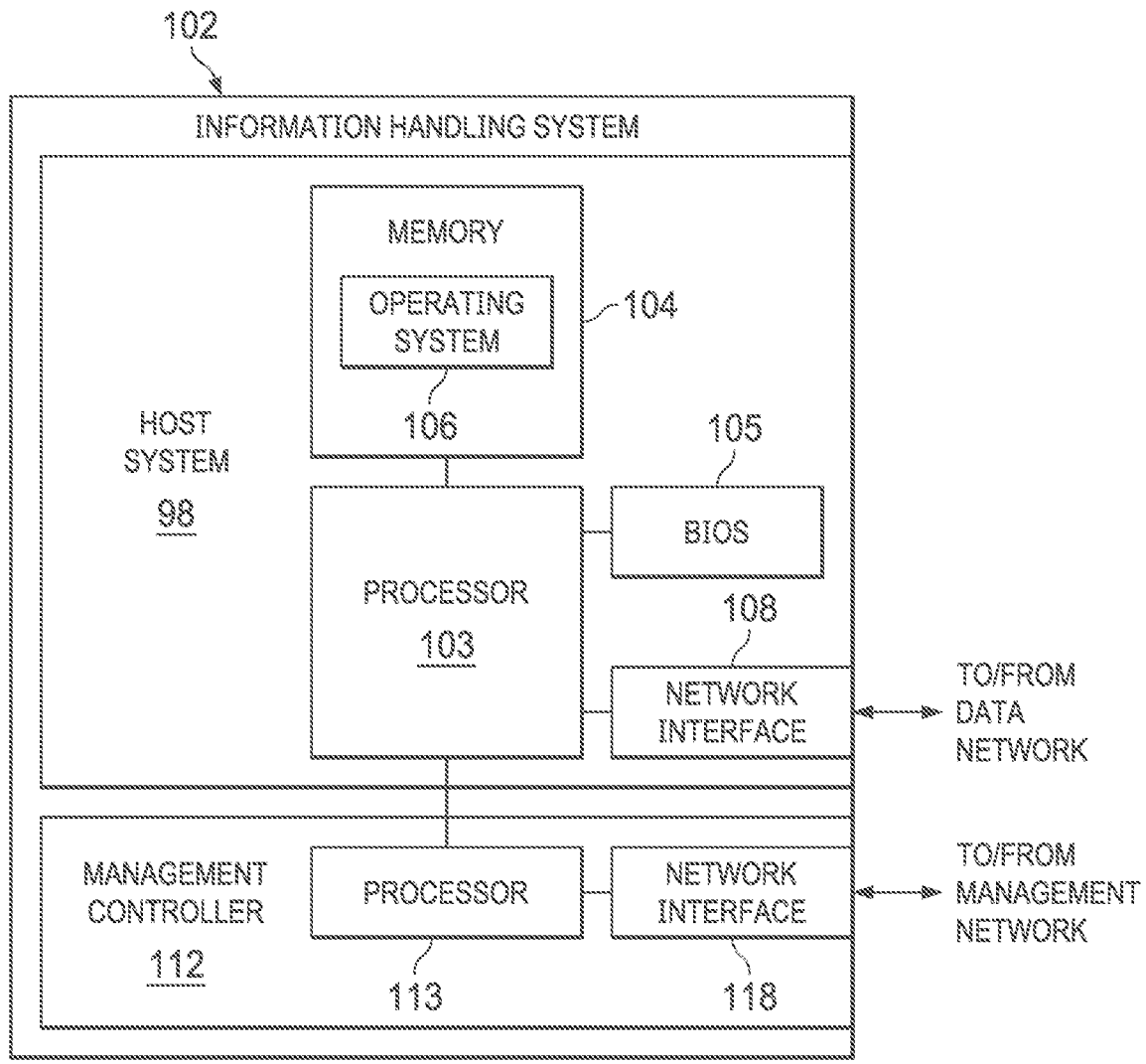
FIG. 1 illustrates a block diagram of an example information handling system, in accordance with embodiments of the present disclosure.

Preferred embodiments and their advantages are best understood by reference to FIGS. 1 through 4, wherein like numbers are used to indicate like and corresponding parts. For the purposes of this disclosure, the term "information handling system" may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For purposes of this disclosure, when two or more elements are referred to as "coupled" to one another, such term indicates that such two or more elements are in electronic communication or mechanical communication, as applicable, whether connected directly or indirectly, with or without intervening elements.

When two or more elements are referred to as "coupleable" to one another, such term indicates that they are capable of being coupled together.

For the purposes of this disclosure, the term "computer-readable medium" (e.g., transitory or non-transitory computer-readable medium) may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; communications media such as wires, optical fibers, microwaves, radio waves, and other electromagnetic and/or optical carriers; and/or any combination of the foregoing.

For the purposes of this disclosure, the term "information handling resource" may broadly refer to any component system, device, or apparatus of an information handling system, including without limitation processors, service processors, basic input/output systems, buses, memories, I/O devices and/or interfaces, storage resources, network interfaces, motherboards, and/or any other components and/or elements of an information handling system.

For the purposes of this disclosure, the term "management controller" may broadly refer to an information handling system that provides management functionality (typically out-of-band management functionality) to one or more other information handling systems. In some embodiments, a management controller may be (or may be an integral part of) a service processor, a baseboard management controller (BMC), a chassis management controller (CMC), or a remote access controller (e.g., a Dell Remote Access Controller (DRAC) or Integrated Dell Remote Access Controller (iDRAC)).

FIG. 1 illustrates a block diagram of an example information handling system 102, in accordance with embodiments of the present disclosure. In some embodiments, information handling system 102 may comprise a server chassis configured to house a plurality of servers or "blades." In other embodiments, information handling system 102 may comprise a personal computer (e.g., a desktop computer, laptop computer, mobile computer, and/or notebook computer). In yet other embodiments, information handling system 102 may comprise a storage enclosure configured to house a plurality of physical disk drives and/or other computer-readable media for storing data (which may generally be referred to as "physical storage resources"). As shown in FIG. 1, information handling system 102 may comprise a processor 103, a memory 104 communicatively coupled to processor 103, a BIOS 105 (e.g., a UEFI BIOS) communicatively coupled to processor 103, a network interface 108 communicatively coupled to processor 103, and a management controller 112 communicatively coupled to processor 103.

In operation, processor 103, memory 104, BIOS 105, and network interface 108 may comprise at least a portion of a host system 98 of information handling system 102. In addition to the elements explicitly shown and described, information handling system 102 may include one or more other information handling resources.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off.

As shown in FIG. 1, memory 104 may have stored thereon an operating system 106. Operating system 106 may comprise any program of executable instructions (or aggregation of programs of executable instructions) configured to manage and/or control the allocation and usage of hardware resources such as memory, processor time, disk space, and input and output devices, and provide an interface between such hardware resources and application programs hosted by operating system 106. In addition, operating system 106 may include all or a portion of a network stack for network communication via a network interface (e.g., network interface 108 for communication over a data network). Although operating system 106 is shown in FIG. 1 as stored in memory 104, in some embodiments operating system 106 may be stored in storage media accessible to processor 103, and active portions of operating system 106 may be transferred from such storage media to memory 104 for execution by processor 103.

Network interface 108 may comprise one or more suitable systems, apparatuses, or devices operable to serve as an interface between information handling system 102 and one or more other information handling systems via an in-band network. Network interface 108 may enable information handling system 102 to communicate using any suitable transmission protocol and/or standard. In these and other embodiments, network interface 108 may comprise a network interface card, or "NIC." In these and other embodiments, network interface 108 may be enabled as a local area network (LAN)-on-motherboard (LOM) card.

Management controller 112 may be configured to provide management functionality for the management of information handling system 102. Such management may be made by management controller 112 even if information handling system 102 and/or host system 98 are powered off or powered to a standby state. Management controller 112 may include a processor 113, memory, and a network interface 118 separate from and physically isolated from network interface 108.

As shown in FIG. 1, processor 113 of management controller 112 may be communicatively coupled to processor 103. Such coupling may be via a Universal Serial Bus (USB), System Management Bus (SMBus), and/or one or more other communications channels.

Network interface 118 may be coupled to a management network, which may be separate from and physically isolated from the data network as shown. Network interface 118 of management controller 112 may comprise any suitable system, apparatus, or device operable to serve as an interface between management controller 112 and one or more other information handling systems via an out-of-band management network. Network interface 118 may enable management controller 112 to communicate using any suitable transmission protocol and/or standard. In these and other embodiments, network interface 118 may comprise a network interface card, or "NIC." Network interface 118 may be the same type of device as network interface 108, or in other embodiments it may be a device of a different type.

Memory 104 of information handling system 102 may comprise (in whole or in part) one or more persistent memory modules. As discussed above, Mixed Mode currently does not offer an option to dynamically manage the size of memory allocated to Memory Mode and/or App Direct Mode from the OS, and so a user may be forced to reboot the system to reconfigure the persistent memory allocation through BIOS settings.

According to some embodiments, this disclosure may provide a way for the OS to dynamically allocate persistent memory based on workload requirements. For example, when there is a requirement to have more space in App Direct Mode or Memory Mode, the OS may allocate more space to the respective modes as needed without performing a system reboot.

With changing workload characteristics in a datacenter, many customers tend to move towards the Mixed Mode, where the persistent memory is usable as system memory as well as persistent storage. Providing an option which dynamically changes the allocation between system memory and persistent storage can offer advantages such as downtime avoidance, as well as enabling a user to modify the allocation based on growing applications' needs.

At a high level, embodiments of this disclosure may involve dynamically allocating persistent memory between volatile (e.g., system memory) and non-volatile (e.g., persistent block storage) regions. A new memory profile may be created in the system BIOS to allow a user to select either static allocation (e.g., an allocation strategy similar to what has been available previously) or dynamic allocation.

When the user opts for the dynamic profile for Mixed Mode, the BIOS may create three memory regions: (1) a fixed region for system memory, (2) a fixed region for persistent storage, and (3) a free pool (which may be referred to as Dynamic Memory Area or DMA).

For example, for a system configured with 6 TB persistent memory, the BIOS may pre-configure 1 TB as system memory, 1 TB as persistent storage, and the remaining 4 TB in the DMA region. Then based on the requirements from higher layers such as applications, the OS memory scheduler and/or block storage subsystem may configure the address ranges from the DMA pool and extend the system memory and/or persistent storage block device as appropriate.

FIG. 2 provides a block diagram illustrating such an arrangement. A portion 202 of the persistent memory is allocated to Memory Mode. A portion 206 is allocated to App Direct Mode. And a portion 204 is a dynamic memory area that can be allocated to either or both, as needed.

According to some embodiments, a workflow may proceed as follows:

1. A user gets a custom option to set a profile to allocate a minimum amount of memory for App Direct mode and Memory Mode when Mixed Mode is enabled.

2. The rest of the space is configured as a free memory space and tagged accordingly.

3. The BIOS configures the persistent memory address ranges accordingly, providing them via the System Physical Address (SPA) range structure as part of the NVDIMM Firmware Interface Table (NFIT). When the user selects the custom option, the BIOS may set up an 'Address Range Type' GUID (e.g., a custom vendor UID) for the dynamic memory area (DMA). The SPA range structure may be as defined in the ACPI Specification 6.3 at Table 5-132, or at a corresponding portion of a previous or successor version of the specification. ACPI Specification 6.3 is incorporated by reference herein in its entirety.

4. Once the OS boots, it reads the NFIT and uses the address ranges designated for system memory and for block I/O. In addition, the OS memory manager may reads the DMA address range using the GUID. At this point, the OS memory manager knows the different physical address ranges used for system memory, block I/O, and DMA (which is kept free but may be hidden from applications).

5. The OS memory manager may use a threshold mechanism for checking the usage of system memory, as well as persistent storage.

6. For example, assume a total persistent memory of 1 TB is available, out of which a user has selected a minimum amount of 256 GB for system memory and 256 GB for App Direct Mode. Thus an amount close to 500 GB would be kept free and hidden in the free pool.

7. The OS memory manager may set up a threshold of, for example, 80% usage warning for both system memory and block storage.

8. When system memory crosses 80% utilization, 5% of the free pool memory (e.g., DMA) may be allocated to the system memory area pool.

9. The SPA range may be passed to the BIOS (e.g., by using any compatible ACPI methods), and the BIOS may extend the volatile memory based on the request, updating the NVDIMM structures using _FIT (e.g., similar to an NVDIMM hot-plug scenario).

10. Similarly, when block storage crosses 80% utilization, 5% of the free pool memory (e.g., DMA) may be allocated as block I/O storage.

11. A block translation table (BTT) driver within the OS may make a call to the BIOS to extend the App Direct space to achieve a particular "goal" in terms of space allocation. In some embodiments, this can be carried out such that the existing goal is changed dynamically so that the BIOS can extend the block storage space and initiate a goal update in the back-end. In some embodiments, a new goal may also be created depending upon the implementation. Once this step is complete, the NVDIMM data structures may be updated by using the _FIT method.

As noted above, embodiments of this disclosure may operate via the use of memory profiles that can be selected in the system BIOS. These preset profiles may handle the allocation ratio of Memory Mode vs. App Direct Mode vs. DMA to match the exact requirements of the user (e.g., based on what purpose the machine is used for). Custom profiles may also be used to allow users to define their own values.

In some embodiments, the size of DMA may be arrived at based on the optimum requirements of Memory Mode and App Direct Mode memory areas. The extension of Memory Mode and App Direct areas may happen sequentially in opposite directions, as shown in the FIG. 2 and discussed above.

As shown, the system BIOS may configure the memory as three partitions. After the initial configuration, the BIOS may pass these details to the OS, and the OS may dynamically manage the memory.

For example, the OS may use the memory configuration details obtained from the BIOS to dynamically extend the memory areas based on runtime requirements. In some embodiments, the _OSC ACPI method may be invoked from the OS to handle the dynamic change in memory areas so that the scheduler and applications are made aware of the changes.

Turning now to FIG. 3, a flow chart is shown of an example method 300 for configuration from the system BIOS, in accordance with some embodiments of this disclosure.

At step 302, a user may enter the appropriate keystroke (e.g., the F2 key in some systems) to enter the system BIOS configuration application. The user may then select the desired memory profile at step 304, as discussed above. The selected memory profile may establish the desired areas for Memory Mode and App Direct Mode at step 306.

The user may then exit the BIOS configuration application at step 308, and the OS may proceed to boot at step 310.

Turning now to FIG. 4, a flow chart is shown of an example method 400 for management of persistent memory from within the OS, in accordance with some embodiments of this disclosure.

At step 402, the OS may boot. At step 404, the OS may fetch the memory configuration details from the BIOS (e.g., by using ACPI methods as discussed above).

At step 406, the OS memory manager may dynamically manage the persistent memory regions as discussed above.

One of ordinary skill in the art with the benefit of this disclosure will understand that the preferred initialization point for the methods depicted in FIGS. 3 and 4 and the order of the steps comprising those methods may depend on the implementation chosen. In these and other embodiments, this methods may be implemented as hardware, firmware, software, applications, functions, libraries, or other instructions. Further, although FIGS. 3 and 4 disclose a particular number of steps to be taken with respect to the disclosed methods, the methods may be executed with greater or fewer steps than depicted. The methods may be implemented using any of the various components disclosed herein (such as the components of FIG. 1), and/or any other system operable to implement the methods.

Although various possible advantages with respect to embodiments of this disclosure have been described, one of ordinary skill in the art with the benefit of this disclosure will understand that in any particular embodiment, not all of such advantages may be applicable. In any particular embodiment, some, all, or even none of the listed advantages may apply.

This disclosure encompasses all changes, substitutions, variations, alterations, and modifications to the exemplary embodiments herein that a person having ordinary skill in the art would comprehend. Similarly, where appropriate, the appended claims encompass all changes, substitutions, variations, alterations, and modifications to the exemplary embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

Further, reciting in the appended claims that a structure is "configured to" or "operable to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke § 112 (f) during prosecution, Applicant will recite claim elements using the "means for [performing a function]" construct.

All examples and conditional language recited herein are intended for pedagogical objects to aid the reader in understanding the invention and the concepts contributed by the inventor to furthering the art, and are construed as being without limitation to such specifically recited examples and conditions. Although embodiments of the present inventions have been described in detail, it should be understood that various changes, substitutions, and alterations could be made hereto without departing from the spirit and scope of the disclosure.

What is claimed is:

1. An information handling system comprising:
    a persistent memory module; and
    a basic input/output system (BIOS);
    wherein the information handling system is configured to:
        prior to initialization of an operating system, receive, at a configuration application of the BIOS, configuration information regarding the persistent memory module;
        in response to the configuration information, allocate a first portion of the persistent memory module to volatile system memory of the information handling system, a second portion of the persistent memory module to non-volatile storage of the information handling system, and a third portion of the persistent memory module to a dynamic memory area; and
        after initialization of the operating system, execute a memory manager configured to alter sizes of the first portion, the second portion, and the third portion, wherein the altering is carried out without performing a reboot of the information handling system, and wherein the altering includes reallocating selected quantities of the third portion to the first portion and the second portion respectively.

2. The information handling system of claim 1, wherein the BIOS is a Unified Extensible Firmware Interface (UEFI) BIOS.

3. The information handling system of claim 1, wherein the configuration information received at the configuration application of the BIOS is a selection of dynamic memory allocation mode.

4. The information handling system of claim 1, wherein the non-volatile storage is block input/output (I/O) storage.

5. The information handling system of claim 1, wherein the first portion of the persistent memory module is allocated to Memory Mode, and the second portion of the persistent memory module is allocated to App Direct Mode.

6. The information handling system of claim 1, wherein the memory manager is configured to use a block translation table (BTT) driver to execute a call to the BIOS to alter the sizes.

7. The information handling system of claim 6, wherein the BIOS is configured to update a data structure associated with the persistent memory module by executing an _FIT method.

8. A method comprising:
    a basic input/output system (BIOS) of an information handling system receiving, prior to initialization of an operating system, configuration information regarding a persistent memory module of the information handling system;
    in response to the configuration information, the BIOS allocating a first portion of the persistent memory module to volatile system memory of the information handling system, a second portion of the persistent memory module to non-volatile storage of the information handling system, and a third portion of the persistent memory module to a dynamic memory area; and
    after initialization of the operating system, the information handling system executing a memory manager configured to alter sizes of the first portion, the second portion, and the third portion, wherein the altering is carried out without performing a reboot of the information handling system, and wherein the altering includes reallocating selected quantities of the third portion to the first portion and the second portion respectively.

9. The method of claim 8, wherein the memory manager altering the sizes is in response to a detection that usage of a particular one of the first, second, and third portions has reached a threshold usage.

10. The method of claim 8, wherein the configuration information received at the configuration application of the BIOS is a selection of dynamic memory allocation mode.

11. The method of claim 8, wherein the non-volatile storage is block input/output (I/O) storage.

12. The method of claim 8, wherein the first portion of the persistent memory module is allocated to Memory Mode, and the second portion of the persistent memory module is allocated to App Direct Mode.

13. The method of claim 8, wherein the memory manager is configured to use a block translation table (BTT) driver to execute a call to the BIOS to alter the sizes.

14. An article of manufacture comprising a non-transitory, computer-readable medium having computer-executable code thereon that is executable by an information handling system for:
    a basic input/output system (BIOS) of the information handling system receiving, prior to initialization of an operating system, configuration information regarding a persistent memory module of the information handling system;
    in response to the configuration information, the BIOS allocating a first portion of the persistent memory module to volatile system memory of the information handling system, a second portion of the persistent memory module to non-volatile storage of the information handling system, and a third portion of the persistent memory module to a dynamic memory area; and
    after initialization of the operating system, executing a memory manager configured to alter sizes of the first portion, the second portion, and the third portion, wherein the altering is carried out without performing a reboot of the information handling system, and wherein the altering includes reallocating selected quantities of the third portion to the first portion and the second portion respectively.

15. The article of claim 14, wherein the BIOS is a Unified Extensible Firmware Interface (UEFI) BIOS.

16. The article of claim 14, wherein the configuration information received at the configuration application of the BIOS is a selection of dynamic memory allocation mode.

17. The article of claim 14, wherein the non-volatile storage is block input/output (I/O) storage.

18. The article of claim 14, wherein the first portion of the persistent memory module is allocated to Memory Mode, and the second portion of the persistent memory module is allocated to App Direct Mode.

19. The article of claim 14, wherein the memory manager is configured to use a block translation table (BTT) driver to execute a call to the BIOS to alter the sizes.

20. The article of claim 19, wherein the BIOS is configured to update a data structure associated with the persistent memory module by executing an _FIT method.

* * * * *